(12) United States Patent
Maxwell

(10) Patent No.: US 9,382,075 B1
(45) Date of Patent: Jul. 5, 2016

(54) TANDEM CONVEYOR

(71) Applicant: Sudenga Industries, Inc., George, IA (US)

(72) Inventor: Cory Marshall Maxwell, Sibley, IA (US)

(73) Assignee: Sudenga Industries, Inc., George, IA (US)

( * ) Notice: Subject to any disclaimer, the term of this patent is extended or adjusted under 35 U.S.C. 154(b) by 0 days.

(21) Appl. No.: 14/599,772

(22) Filed: Jan. 19, 2015

Related U.S. Application Data

(63) Continuation of application No. 13/605,300, filed on Sep. 6, 2012, now Pat. No. 8,960,412.

(51) Int. Cl.
   *B65G 47/04* (2006.01)
   *B65G 37/00* (2006.01)

(52) U.S. Cl.
   CPC .................................. *B65G 37/00* (2013.01)

(58) Field of Classification Search
   CPC ...... B65G 47/18; B65G 11/206; B61D 47/00; B61D 3/18; B61D 7/06
   USPC ............... 198/530, 531, 534, 860.1; 414/334, 414/809, 378
   See application file for complete search history.

(56) References Cited

U.S. PATENT DOCUMENTS

| 1,567,837 | A | 12/1925 | Comer |
| 1,822,530 | A | 9/1931 | Kind |
| 2,754,982 | A | 7/1956 | Hoffmeister et al. |
| 2,853,960 | A | 9/1958 | Corrigan |
| 3,528,570 | A | 9/1970 | Pase |
| 3,802,584 | A | 4/1974 | Sackett, Sr. et al. |
| 3,951,278 | A | 4/1976 | Pase |
| 3,978,978 | A | 9/1976 | Herter |
| 4,233,269 | A * | 11/1980 | Kaye ..................... B01F 5/0451 261/114.1 |
| 4,545,959 | A * | 10/1985 | Schilling ................... B01J 8/34 34/369 |
| 4,738,774 | A | 4/1988 | Patrick |
| 5,964,566 | A | 10/1999 | Stewart et al. |
| 6,269,849 | B1 | 8/2001 | Fields, Jr. |

(Continued)

OTHER PUBLICATIONS

"Sudenga Industries Introduces Model 4012 Low Profile 10,000 BPH Conveyor," obtained from http://www.biofuelsjournal.com, published Jul. 26, 2005, printed Mar. 28, 2012, 2 pages.

(Continued)

*Primary Examiner* — James R Bidwell
(74) *Attorney, Agent, or Firm* — Mai-Tram D. Lauer; Westman, Champlin & Koehler, P.A.

(57) ABSTRACT

In one aspect, an apparatus includes an elongated housing, first and second spaced-apart material inlet openings in a top wall of the housing, an outlet opening in a bottom wall of the housing, a first conveyor configured to move material received from the first material inlet toward the outlet opening, and a second conveyor configured to move material received from the first material inlet toward the outlet opening. The outlet opening is longitudinally disposed between the first and second spaced-apart material inlet openings. In another aspect, an apparatus includes a housing having first and second opposite ends and an outlet opening in a bottom wall of the housing. The first end is configured to receive a portion of a first conveyor and the second end is configured to receive a portion of a second conveyor. The first and second conveyors are configured to move material toward the outlet opening.

10 Claims, 4 Drawing Sheets

(56) References Cited

U.S. PATENT DOCUMENTS

| | | |
|---|---|---|
| 7,090,066 B2 | 8/2006 | Kirsch |
| 7,351,026 B2 | 4/2008 | Ash |
| 8,196,729 B2 | 6/2012 | Gausman et al. |
| 8,430,225 B2 | 4/2013 | Gausman et al. |
| 2002/0100390 A1 | 8/2002 | Jwuc et al. |
| 2006/0198721 A1 | 9/2006 | Harrold |
| 2009/0118443 A1* | 5/2009 | Stavens .................. B01J 8/1818 526/62 |
| 2009/0245987 A1 | 10/2009 | Ash |

OTHER PUBLICATIONS

"4012 Drive Over Conveyor," distributed by Sudenga Industries, Inc., Oct. 2008, 2 pages.

"Drag Chain Conveyors" distributed by Sudenga Industries, Inc., Dec. 2007, 36 pages.

* cited by examiner

TANDEM CONVEYOR

CROSS-REFERENCE TO RELATED APPLICATION

The present application is a continuation of U.S. patent application Ser. No. 13/605,300, filed Sep. 6, 2012, which issued as U.S. Pat. No. 8,960,412 on Feb. 24, 2015, for "Tandem Conveyor," which is hereby incorporated by reference in its entirety.

BACKGROUND

The present disclosure relates to a low-profile drive-over conveyor assembly for use in moving grain and other particulate material. Grain and other particulate products are typically transported in vehicles known as "belly-dump" and/or "side-dump" trucks or in similarly functioning trailers. Such trucks or trailers open from the bottom and/or side of the grain hopper basin and empty their contents using the force of gravity. These trucks or trailers were originally designed to empty their contents into pits built into the ground. However, it often is not feasible for a pit to be excavated into the ground; thus, an alternative device is needed to receive the contents of such trucks or trailers. In a drive-over grain hopper for this purpose, a low profile is desired, since belly-dump and side-dump trucks and trailers are designed with low ground clearance. Additionally, it is advantageous if a drive-over grain hopper is capable of moving large amounts of grain in order to facilitate rapid unloading of such trucks or trailers.

SUMMARY

In one aspect, this disclosure describes an apparatus comprising an elongated housing, first and second spaced-apart material inlet openings in a top wall of the housing, an outlet opening in a bottom wall of the housing, a first conveyor configured to move material received from the first material inlet toward the outlet opening, and a second conveyor configured to move material received from the first material inlet toward the outlet opening. The outlet opening is longitudinally disposed between the first and second spaced-apart material inlet openings.

In another aspect, this disclosure describes an apparatus comprising a housing having first and second opposite ends and an outlet opening in a bottom wall of the housing. The first end is configured to receive a portion of a first conveyor and the second end is configured to receive a portion of a second conveyor. The first and second conveyors are configured to move material toward the outlet opening.

In yet another aspect, this disclosure describes an apparatus comprising a horizontally-disposed rectangular plate and a raised portion that extends from the plate. The plate is symmetrical about a vertical plane and comprises a plurality of apertures. The raised portion comprises an apex located on the vertical plane.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure is directed to a low-profile tandem drive-over conveyor for grain or other material that is emptied from hoppers of a grain truck or trailer or similar reservoir. In an exemplary method of use, a truck or trailer having two full hoppers drives over the tandem conveyor, which is installed in a ground excavation in an exemplary embodiment. The truck or trailer is positioned so that the two hopper outlets are above two spaced-apart intake grates of the tandem conveyor. The truck empties its loads simultaneously into the two spaced-apart grates. The tandem conveyor uses dual conveyors, such as side chains with paddles, to move the material from each of the two spaced-apart grates toward a central dump-through opening over a single grate of a single conveyor positioned generally orthogonal to the tandem conveyor. A distributor, which in an exemplary embodiment is in the form of a plate with a raised triangular central portion and surrounding slots, is placed between the dump-through opening of the tandem conveyor and the intake of the single conveyor to prevent clogging as material from both of the spaced-apart intake grates of the tandem conveyor comes together and is deposited onto the single conveyor. The material then travels on the grain moving mechanism of the single conveyor, to be directed to a desired location.

Figure 1:
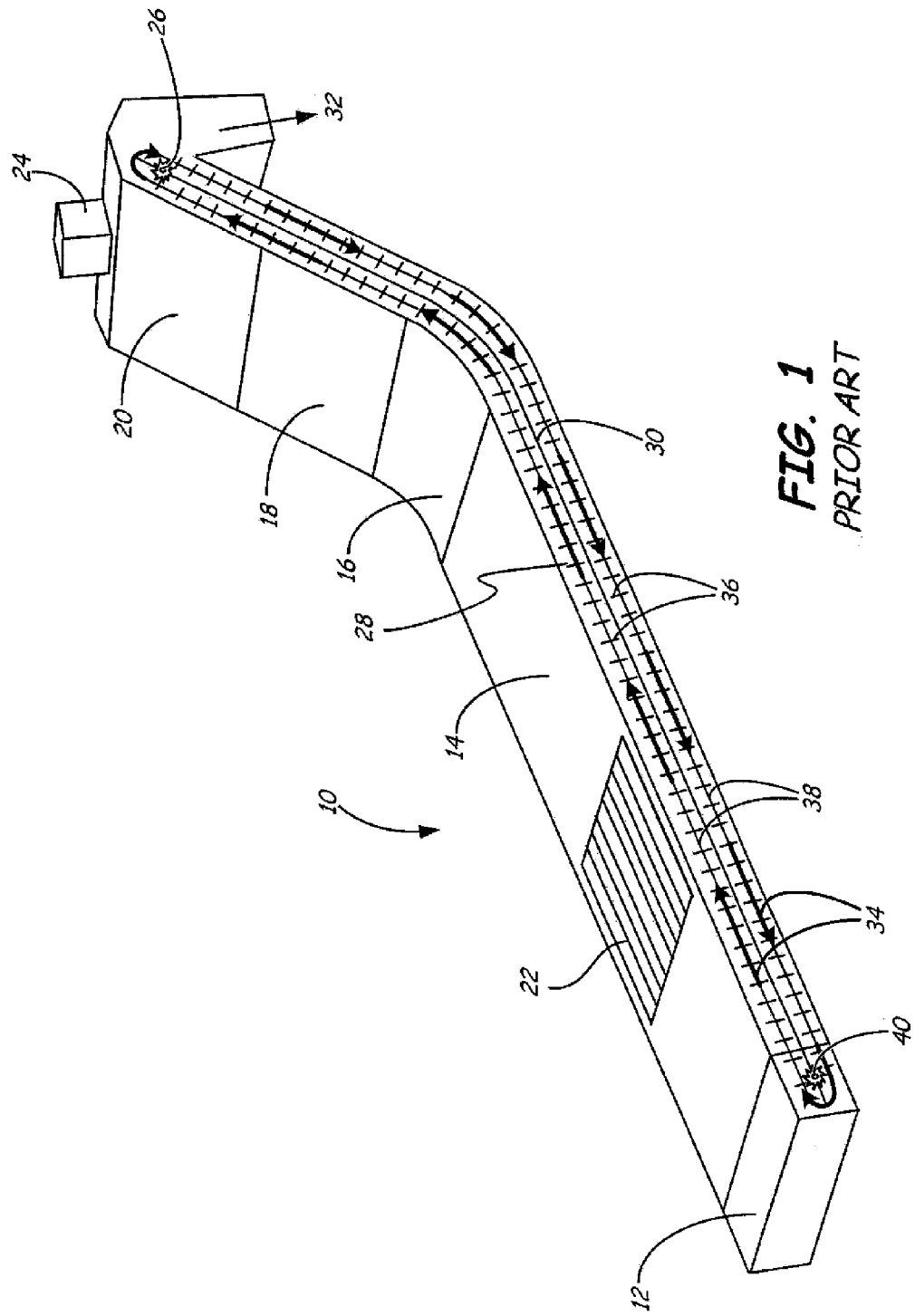
FIG. 1 is a perspective view of a prior art drive-over conveyor.

FIG. 1 is a perspective view of a prior art drive-over conveyor 10 having a tail 12, horizontal section 14, curve section 16, incline section 18, and head 20. Such a conveyor is also disclosed in U.S. Pat. No. 5,964,566 to Stewart et al., of Sudenga Industries, Inc., the disclosure of which is fully incorporated herein by reference. Intake opening 22 typically covered by a grid or grate to allow particulate material to pass therethrough is positioned over an opening in an upper wall of horizontal section 14.

A side wall of the conveyor 10 is not shown so that the drive mechanism is visible in the illustration. The drive mechanism of conveyor 10 includes a motor 24 operably connected to chain sprocket 26. Paddles 36 in an exemplary embodiment are supported on an endless chain linkage 38 of a type commonly known in the art, having discrete longitudinal lengths connected by lateral pivot pins. The endless conveyor chain linkage 38 is configured to form an endless loop which extends around chain sprockets 26 and 40 and over and under grain transfer bed 30. Paddles 34 moves in the direction indicated by arrows 34, thereby moving grain along grain transfer path 28 on a top surface of grain transfer bed 30. More details on the configuration of endless conveyor chain linkage 38 can be found in commonly assigned U.S. Pat. No. 5,964,566, which is hereby incorporated by its reference in its entirety.

Grain transfer path 28 is defined on an upper surface of grain transfer bed 30 from intake opening 22 to discharge outlet 32. While the discussed embodiment refers to grain in particular, it is to be understood that the apparatuses and methods of this disclosure also apply to other particulate material. After the grain falls by gravity through discharge outlet 32, the endless conveyor chain linkage 38 continues with no grain thereon under grain transfer bed 30, around sprocket 40, and back under intake opening 22, where incoming grain is then conveyed along grain transfer path 28. In an exemplary embodiment, conveyor 10 is designed to move particulate material from inlet opening 22 to head 20 at a rate of about ten thousand bushels per hour.

Figure 2:
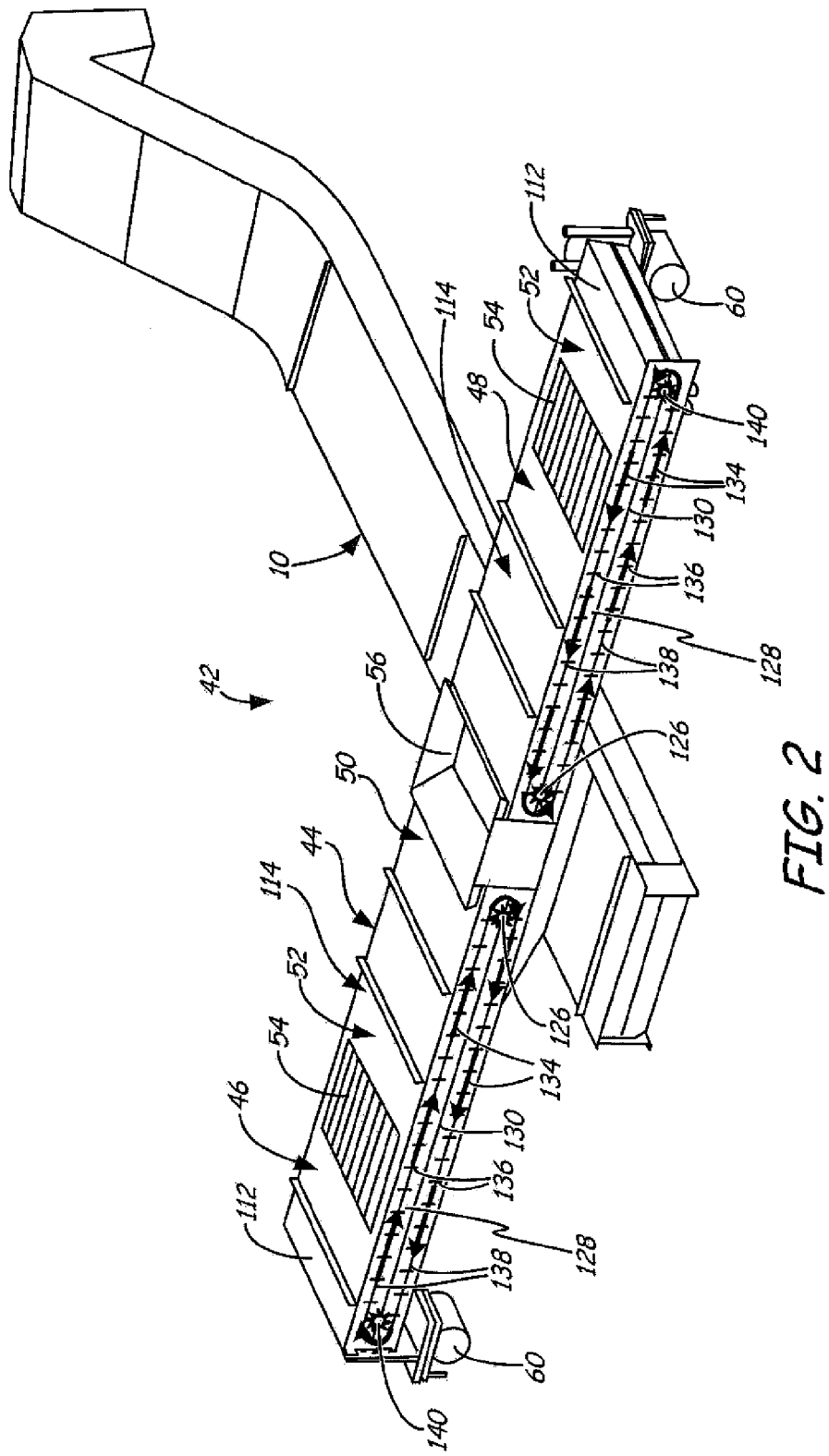
FIG. 2 is a perspective view of an exemplary tandem drive-over conveyor assembly of the present disclosure.

FIG. 2 is a perspective view of an exemplary tandem drive-over conveyor assembly 42 of the present disclosure. Tandem conveyor assembly 42 includes tandem conveyor 44 arranged in a manner to feed particulate material to transverse conveyor 10, which is positioned orthogonal to tandem conveyor 44. In the illustrated embodiment, tandem conveyor 44 comprises lateral conveyors 46 and 48 connected to head assembly 50. Each of lateral conveyors 46 and 48 includes tail 112 and horizontal section 114. Head assembly 50 contains the heads of each of lateral conveyors 46, 48. Tandem conveyor 44 includes an elongated housing 52, a side panel of which is removed in the illustrated embodiment for viewing of the drive mechanisms of lateral conveyors 46 and 48. Each lateral conveyor 46, 48 includes an intake opening 54 disposed on a top wall of housing 52. Thus, tandem conveyor 44 includes two spaced apart material inlet openings, at intake openings 54.

In an exemplary embodiment, spaced apart intake openings 54 (covered, for example by a grid or grate to allow particulate material to pass therethrough) are positioned to allow for simultaneous receipt of the contents of double hopper trailers or trucks, which have two spaced-apart hoppers on a single wagon or trailer. In an exemplary embodiment, the spacing between intake openings 54 is adjustable to accommodate different spacing between the two hoppers of double-hopper trailers and trucks. The grain flowing through each of the intake openings 54 is conveyed along its respective endless conveyor chain linkage 138 toward outlet opening 53 (shown in FIG. 5 and discussed below). Each endless conveyor chain linkage 138 is supported on chain sprockets 126 and 140 to move paddles 136 in the directions indicated by arrows 134 in an endless loop around grain transfer bed 130. Motors associated with each of endless conveyor chain linkages 138 are not shown, but their operation is similar to that discussed above with endless conveyor chain linkage 38. Lateral grain transfer paths 128 extend from each intake opening 54 along a top surface of grain transfer bed 130 to central opening 56. The endless conveyor chain linkages 138 are each configured to form an endless loop which extends around chain sprockets 126 and 140 and over and under grain transfer beds 130. Other details of a conveyor drive mechanism of this type are disclosed in commonly assigned U.S. Pat. No. 5,964,566, which is hereby incorporated by reference.

Figure 5:
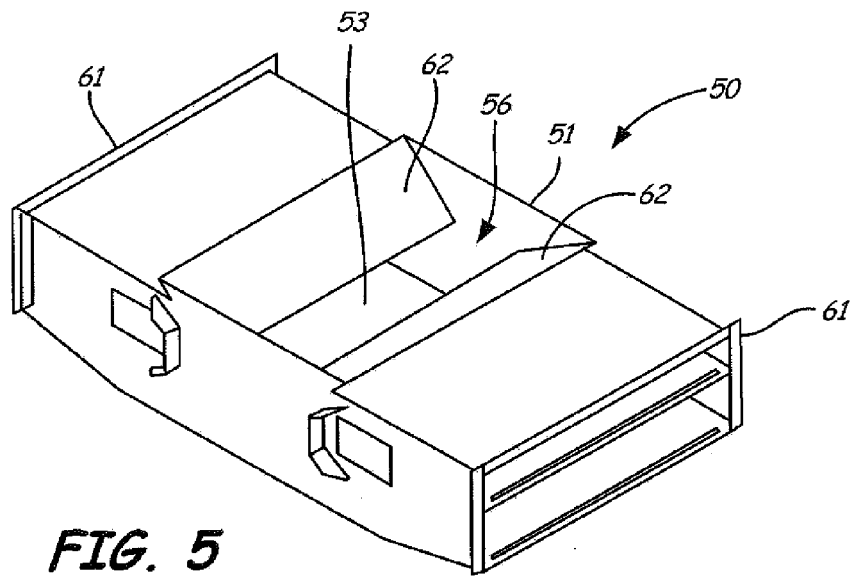
FIG. 5 is a perspective view of a head assembly of the exemplary tandem conveyor assembly.

In an exemplary embodiment, housing 52 includes head assembly 50 longitudinally disposed between spaced-apart intake openings 54. FIG. 5 is a perspective view of an exemplary head assembly 50 to which the lateral conveyors 46, 48 are connected. In the illustrated embodiment, the horizontal section 114 of each of the lateral conveyors 46, 48 is fastened to head assembly 50 at end flanges 61. Central opening 56 extends vertically though head assembly 50 and thereby includes an inlet opening 51 in a top surface of head assembly 50 and an outlet opening 53 in a bottom surface of head assembly 50. Central opening 56 is flanked by funnel flaps 62, each disposed at an angle of 45° from the horizontal, to facilitate the draining of particulate material through central opening 56. Grain entering head assembly 50, whether by direct deposit through inlet opening 51 or by conveyance from intake openings 54, flows out of outlet opening 53. In an exemplary embodiment, chain sprockets 126 are disposed within assembly 50 (as shown in FIG. 2).

In one exemplary embodiment, such grain then flows onto and through distributor 58 before entering intake opening 22 (i.e., an opening in a top wall of horizontal section) of conveyor 10. In another embodiment, distributor 58 is omitted, and grain flows directly through central opening 56 and into conveyor 10. As described in more detail below, distributor 58 is designed to evenly spread the flow of grain across a width of grain transfer bed 30, thereby facilitating a high flow rate while minimizing a potential for clogging.

Figure 3:
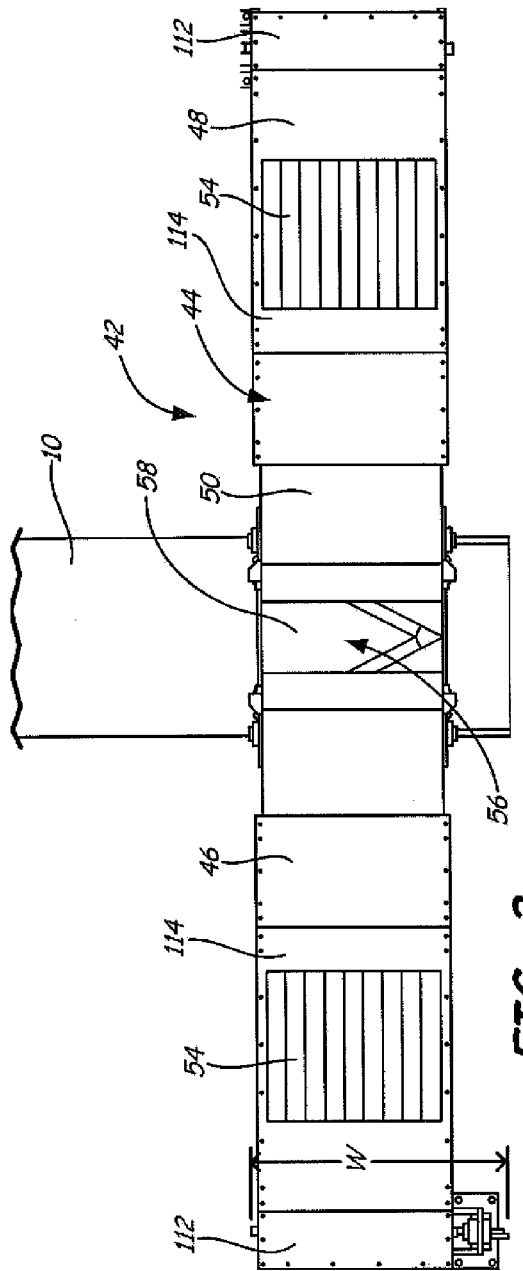
FIG. 3 is a top plan view of the tandem conveyor assembly of FIG. 2.
Figure 4:
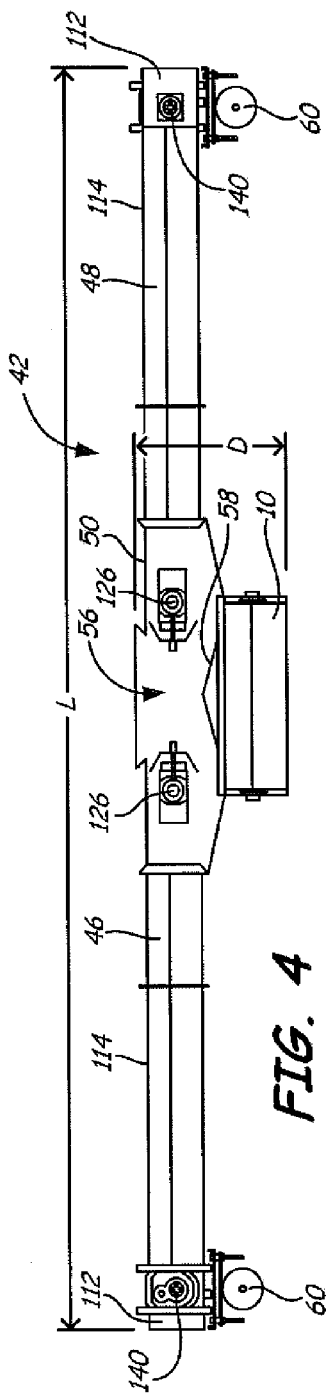
FIG. 4 is a side elevation view of the tandem conveyor assembly of FIGS. 2 and 3.

FIGS. 3 and 4 are top plan and side elevation views, respectively, of tandem conveyor assembly 42. Each of lateral conveyors 46, 48 is supported in exemplary embodiment at tails 112 by height-adjustable casters 60 on a ground surface. Thus, even if the ground surface is not level, that tandem conveyor 44 can be disposed in a generally level horizontal position. In an exemplary embodiment, an exemplary length L of tandem conveyor 44 is approximately 22 feet; an exemplary width W of tandem conveyor 44 is about 57 inches; and an exemplary depth D of tandem conveyor 42 is approximately 33 inches.

Figure 6:
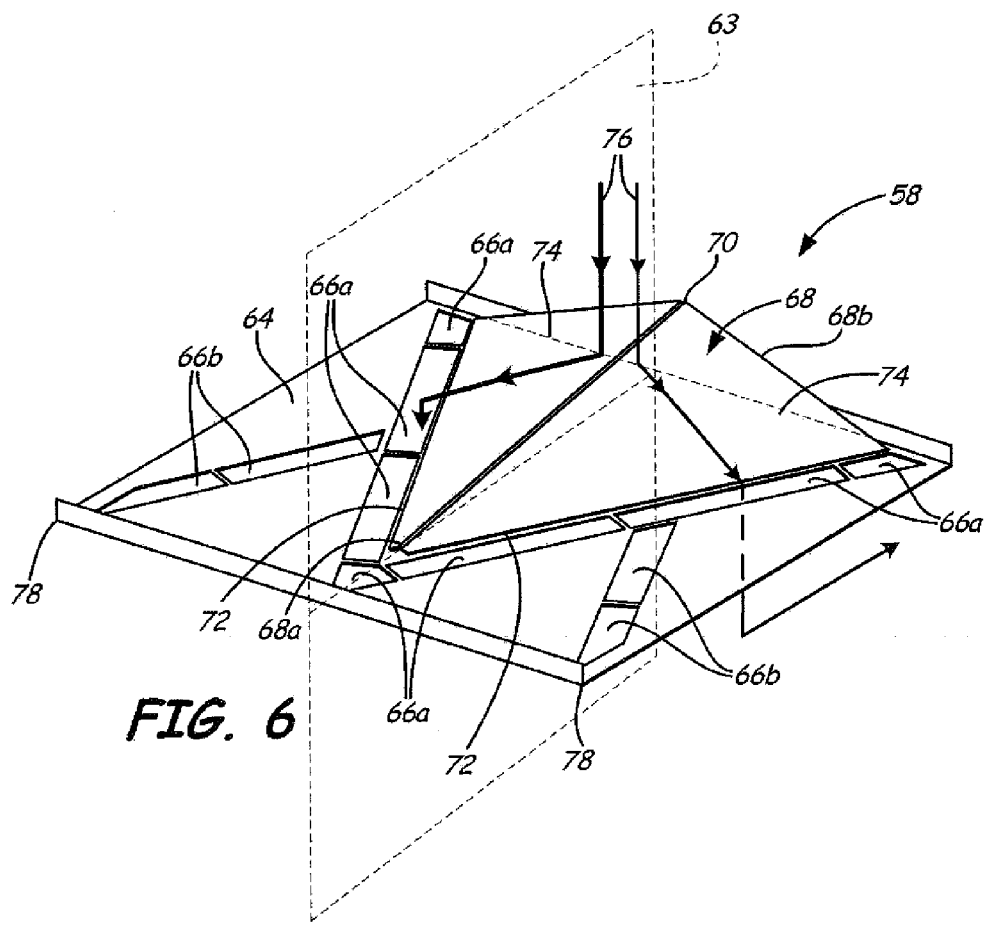
FIG. 6 is a perspective view of a distributor plate optionally disposed within the tandem conveyor assembly of FIG. 2.

FIG. 6 is a perspective view of an exemplary distributor 58, which is positioned between central opening 56 of tandem conveyor 44 and intake opening 22 of conveyor 10 in an exemplary embodiment. A discussion of upstream and downstream directions with reference to FIG. 6 will be with reference to the flow direction of grain transfer path 28 of conveyor 10, onto which the grain will flow after flowing through distributor 58. Distributor 58 is designed so that grain flowing through central opening 56 is distributed evenly across a width of conveyor 10. In the illustrated design, distributor 58 is symmetrical about vertical plane 63, which transversely bisects distributor 58. In an exemplary embodiment, distributor 58 includes plate or surface 64 having a plurality of apertures in the form of slots 66 therethrough. Slots 66 are arranged on plate 64 around a raised triangular portion 68. In an exemplary embodiment, triangular portion 68 has a narrow upstream dimension (as at 68a) and a wider downstream dimension (as at 68b). In an exemplary embodiment, plate 64 is about 43 inches square and raised triangular portion 68 has a pyramidal configuration with a height of about 6.5 inches at apex or peak 70. Each of two sloped faces 74 rises at a shallow angle from intersections 72 on plate 64 to peak 70 on plane 63.

Grain entering through central opening 56 impinges upon distributor 58 at faces 74, plate 64, or flows directly down through slots 66. Two exemplary flow paths 76 are illustrated, though many other paths are possible. A function of distributor 56 is to evenly spread the flow of particulate material across a width of intake opening 22 of conveyor 10 to allow for the highest processing flow rate without undue clogging. In an exemplary embodiment, this is accomplished by the positioning of elongated slots 66a about a perimeter of raised triangular portion 68 proximate intersections 72. Other sets of elongated slots 66b extend from upstream corners 78 of plate 64 toward a midpoint of the line of slots 66a. In an exemplary embodiment, each of the slots 66 has a width of about 3 to about 4 inches.

In an exemplary embodiment, tandem conveyor assembly 42 is installed to be driven over by a truck or trailer. In a typical installation, tandem conveyor assembly 42 is positioned in a trough excavated into the ground. The low profile of tandem conveyor assembly 42 is particularly advantageous where a high water table resides under the ground surface. Use of the disclosed tandem conveyor assembly 42 is also economical because little site preparation is required. In another installation, ramps can be used on which the truck or trailer can travel to position the hopper openings of the truck or trailer over the intake openings 54 of the tandem conveyor 44.

The tandem conveyor assembly 42 of the present disclosure accommodates the simultaneous unloading of hoppers on trailers and trucks where there are two hoppers (using both intake openings 54), those where there is a single hopper (using central opening 56, which lies above intake openings 22 of single conveyor 10), and those where there is a triple hopper (using both intake openings 54 and central opening 56). In an exemplary embodiment of tandem assembly 42, each of lateral conveyors 46 and 48 is designed to move particulate material from each of intake opening 54 to central opening 56 at a rate of about five thousand bushels per hour, thereby feeding single conveyor 10 material at a rate of about ten thousand bushels per hour. Thus, tandem conveyor assembly 42 is capable of moving large amounts of grain in order to facilitate rapid unloading of truck or trailer hoppers.

In an exemplary method of use, a truck or trailer containing particulate material such as grain is driven over tandem conveyor 44 so that outlets of the hoppers of the truck/trailer are positioned over the intake openings 54 and/or central opening 56. The hopper outlet doors are opened, thereby allowing the grain to flow into the intake openings 54 and/or central opening 56. The grain is moved along grain transfer paths 28 to central outlet opening 53 of tandem conveyor assembly 42 to feed into conveyor 10. In transverse conveyor 10, the grain moves on grain transfer path 28 and out discharge outlet 32, for deposit into a desired receptacle. Once the hoppers are empty, the truck/trailer is driven away. Another truck/trailer with full hoppers is driven over tandem conveyor 44 so that outlets of the full hoppers of the truck/trailer are positioned over the intake openings 54 and/or central opening 56, and the process of grain deposition and movement is repeated.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus comprising:
    an elongated housing comprising a top wall, a bottom wall, and a plurality of side walls;
    first and second spaced-apart material inlet openings in the top wall of the housing;
    an outlet opening in the bottom wall of the housing, the outlet opening longitudinally disposed between the first and second spaced-apart material inlet openings;
    a first conveyor disposed within the housing and configured to move material received from the first material inlet toward the outlet opening, wherein the first conveyor comprises a first material transfer bed disposed under the first material inlet opening and a first linkage extending longitudinally over and under the first material transfer bed; and
    a second conveyor disposed within the housing and configured to move material received from the second material inlet toward the outlet opening, wherein the second conveyor comprises a second material transfer bed disposed under the second material inlet opening and a second linkage extending longitudinally over and under the second material transfer bed.

2. The apparatus of claim 1 further comprising a transverse conveyor disposed under the outlet opening, orthogonal to the elongated housing.

3. The apparatus of claim 1 wherein the housing further comprises a head assembly disposed on the housing, the head assembly comprising the outlet opening, wherein each of the first and second conveyor linkages extends around two sprockets, and wherein one of the sprockets of each of the first and second conveyor linkages is disposed within the head assembly.

4. The apparatus of claim 3 wherein the head assembly further comprises a third centrally disposed inlet opening in the top wall of the housing.

5. The apparatus of claim 1 further comprising a distributor disposed below the outlet opening, wherein the distributor comprises a plate having a raised triangular portion and a plurality of slots disposed in the plate and surrounding the triangular portion.

6. An apparatus comprising:
    a housing having a top wall, a bottom wall, a plurality of side walls, and first and second opposite ends, the first end configured to receive a portion of a first conveyor and the second end configured to receive a portion of a second conveyor; and
    an outlet opening in the bottom wall of the housing;
    wherein the first and second conveyors are configured to move material toward the outlet opening;
    wherein the first conveyor comprises a first material transfer bed disposed under the first material inlet opening and a first linkage extending longitudinally over and under the first material transfer bed; and
    wherein the second conveyor comprises a second material transfer bed disposed under the second material inlet opening and a second linkage extending longitudinally over and under the second material transfer bed.

7. The apparatus of claim 6 further comprising an inlet opening in the top wall of the housing.

8. An apparatus comprising:
- a horizontally-disposed rectangular plate that is symmetrical about a vertical plane, the plate comprising a plurality of apertures in a planar, horizontally-disposed surface; and
- a raised portion that extends from the plate and comprises:
  - two triangular faces that extend from the plate at two intersections; and
  - an apex located on the vertical plane.

9. The apparatus of claim 8 wherein at least some of the plurality of apertures are positioned proximate the intersections of the faces with the plate.

10. The apparatus of claim 8 wherein at least some of the plurality of apertures comprise elongated slots.

\* \* \* \* \*